United States Patent [19]

Ericson et al.

[11] 4,033,660
[45] July 5, 1977

[54] HIGH CURRENT ELECTRICAL JOINT APPARATUS

[75] Inventors: Eric A. Ericson, Plainville; Frederick D. Kaufhold, Forestville, both of Conn.

[73] Assignee: General Electric Company, New York, N.Y.

[22] Filed: Aug. 16, 1976

[21] Appl. No.: 714,524

[52] U.S. Cl. .......................... 339/75 M; 339/22 B; 339/92 M; 339/112 R
[51] Int. Cl.² ........................................ H01R 13/54
[58] Field of Search ............ 339/22 R, 22 B, 75 R, 339/17, 91 R, 92 R, 92 M, 112 R

[56] References Cited
UNITED STATES PATENTS

| | | | |
|---|---|---|---|
| 3,189,680 | 6/1965 | Stanback | 339/22 B X |
| 3,683,313 | 8/1972 | Weimer et al. | 339/22 B |
| 3,742,121 | 6/1973 | Schmidt | 339/22 B X |
| 3,820,057 | 6/1974 | Joly | 339/22 B |
| 3,879,100 | 4/1975 | Chabot | 339/112 R |

*Primary Examiner*—Roy Lake
*Assistant Examiner*—E. F. Desmond

*Attorney, Agent, or Firm*—Robert A. Cahill; Walter C. Bernhopf; Frank L. Neuhauser

[57] ABSTRACT

Electrical joint apparatus includes an array of stab connectors each having a pair of spaced contact fingers and an array of receiver connectors each also having a pair of spaced contact fingers arranged in individual lapped relation with respective contact fingers of an associated stab connector. Heat sinks are mounted with suitable insulators between the contact fingers of adjacent stab connectors and also between the contact fingers of each receiver connector. A clamping rod extends freely through aligned apertures in the stab fingers, heat sinks and insulators and through notches in the receiver fingers and the heat sinks mounted therebetween. The compression springs are carried by the rod at each end of the stab connector array. A first cam follower, affixed to one end of the rod and a second cam follower movably supported on the rod are driven in opposite directions by a cam, such as to uniformly compress the springs, and thereby develop equal and oppositely directed forces clamping the lapped fingers in electrical interconnection.

15 Claims, 6 Drawing Figures

HIGH CURRENT ELECTRICAL JOINT APPARATUS

REFERENCE TO RELATED APPLICATION

The instant invention constitutes an improvement over the invention disclosed and claimed in applicants' co-pending application entitled "High Current Electrical Joint Apparatus," Ser. No. 698,280, filed June 21, 1976, and the disclosure of this co-pending application is specifically incorporated herein by reference.

BACKGROUND OF THE INVENTION

Drawout apparatus are well-known expedients for facilitating the installation and removal of physically large electrical devices, such as switches and circuit breakers, with respect to switchboards and the like. The devices are equipped with plug-in or stab-type disconnect primary contacts which mate in electrical interconnection with complementary switchboard primary disconnect contacts incident to racking movement of the device to its innermost, engaged position, thereby making the electrical joints requisite to electrically connecting the device into the switchboard.

The principal limitation to the utilization of drawout apparatus is the ability of the plug-in primary terminal joints to carry the increasingly higher currents called for in many applications. These joints invariably constitute sources of heat which can contribute to an intolerable high temperature condition within the switchboard. The spring forces incorporated in such plug-in terminal connectors and their mutual contact surface areas, which will accommodate sliding relative movements of the mating connectors incident to making and breaking the joints, are not sufficient to achieve cool-running joints in high current applications. The most practical approach to achieving cool-running joints is to resort to bolted interconnections. However, such bolted joints for drawout installations sacrifice the advantage of being able to connect and disconnect the device from a live switchboard without having to operate directly on the primary terminal joints.

It is accordingly an object of the present invention to provide improved electrical joint apparatus of high current capacity having particular but not limited application in switchboard drawout apparatus.

An additional object of the present invention is to provide electrical joint apparatus of the above character which is operable to simultaneously make a plurality of electrically isolated high current carrying electrical joints.

A further object of the present invention is to provide electrical joint apparatus of the above character, which is operable to make plural, reliable electrical joints in highly repeatable fashion.

Yet another object of the present invention is to provide joint apparatus of the above character, which is capable of perfecting electrical joints having all of the characteristics and attributes of bolted joints.

An additional object is to provide electrical joint apparatus of the above character which is efficient in design and conveniently manually operable in a rapid fashion.

Other objects of the invention will in part be obvious and in part appear hereinafter.

SUMMARY OF THE INVENTION

In accordance with the present invention, there is provided electrical joint apparatus of high current carrying capacity having particular but not limited application in switchboard drawout apparatus. The joint apparatus of the invention constitutes an improvement in terms of current carrying capacity and design efficiencies over the construction disclosed in applicants' above-noted co-pending application, Ser. No. 698,280. In both instances, the joint apparatus provides the unique capability of manually perfecting from a safe, removed location, cool-running joints similar to and having the attributes of bolted joints. Other common attributes reside in the capability of achieving plural electrical joints simultaneously in a simple, rapid, reliable and highly repeatable fashion. Moreover, the joint apparatus of the present invention, like the joint apparatus of our above-noted co-pending application, operates to generate equal and oppositely directed clamping forces on the individual electrical joints, and consequently there is no resultant force acting on the joint apparatus once the joints have been perfected.

More specifically, the joint apparatus of the present invention includes an array of spaced stab electrical connectors, each equipped with a pair of contact fingers arranged in parallel spaced relation. Also included is an array of receiver electrical connectors, each associated with a different one of the stab connectors and also having a pair of contact fingers individually arranged for juxtaposition in lapped relation with respective contact fingers of its associated stab connector. Thus, the joint apparatus of the present invention utilizes individual connectors configured to provide significant manufacturing economies as compared to the joint apparatus of the above-noted co-pending application, wherein the individual connectors are constructed having a multiplicity (more than two) of contact fingers. To improve the current carrying capacity of the present invention, the two contact fingers of each receiver connector serve to mount between them a heat sink effective to draw away from the stab finger-receiver finger interfaces. These heat sinks are provided with radiating fins to promote dissipation of the heat into the surrounding environment. The efficient removal of this heat allows the joints to run cooler and thus carry more current than would otherwise be possible.

To further enhance the removal of heat from the joints, additional heat sinks are mounted with suitable insulators between the contact fingers of adjacent stab connectors.

An elongated clamping rod extends freely through aligned apertures in the stab fingers, heat sinks and insulators, and, with the stab and receiver fingers in lapped relation, through notches formed in the forward edges of the receiver fingers and the heat sinks mounted therebetween. A first cam follower is fixedly mounted to one end of the rod, while a second cam follower is movably mounted on the rod in juxtaposed relation with the first cam follower. The rod also mounts compression springs at each end of the stab connector array.

Camming means is provided for driven movement between joint clamping and joint unclamping positions. The camming means, while in its unclamping position, engages the first and second cam followers such as to sustain the compression springs in substantially unloaded conditions, thus permitting the contact fingers of associated stab and receiver connectors to readily move into and away from lapped relations. However, when the camming means is driven to its clamping position, the first and second cam followers are cammed in opposite directions to uniformly load the compression springs and thereby develop substantially equal and oppositely directed forces effective to clamp the lapped contact fingers in secure electrical interconnection.

The invention accordingly comprises the features of construction and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description, taken in connection with the accompanying drawings, in which.

Like reference numerals refer to corresponding parts throughout the several views of the drawings.

DETAILED DESCRIPTION

Figure 1:
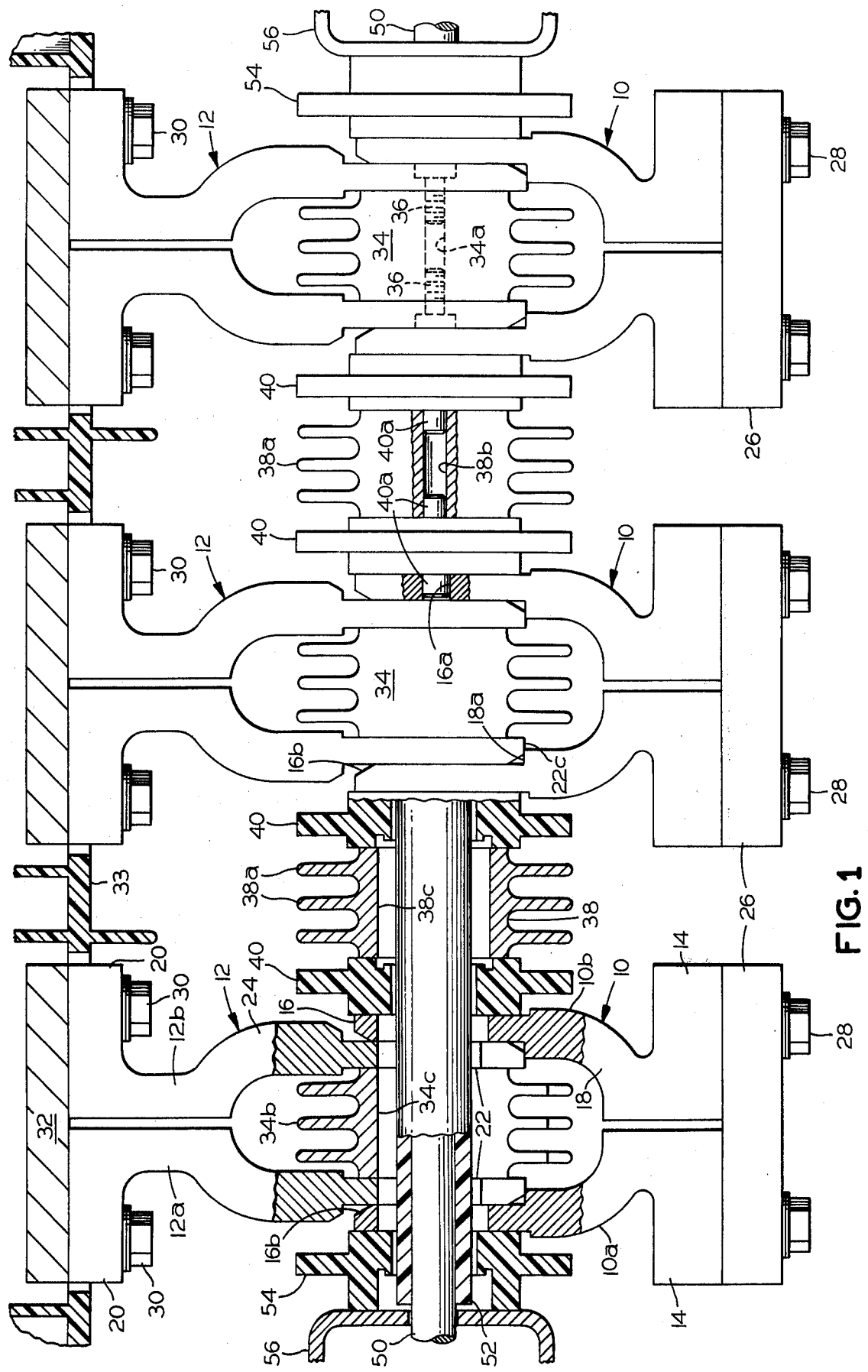
FIG. 1 is a plan view, partially broken away, of electrical joint apparatus constructed in accordance with an embodiment of the present invention.
Figure 3:
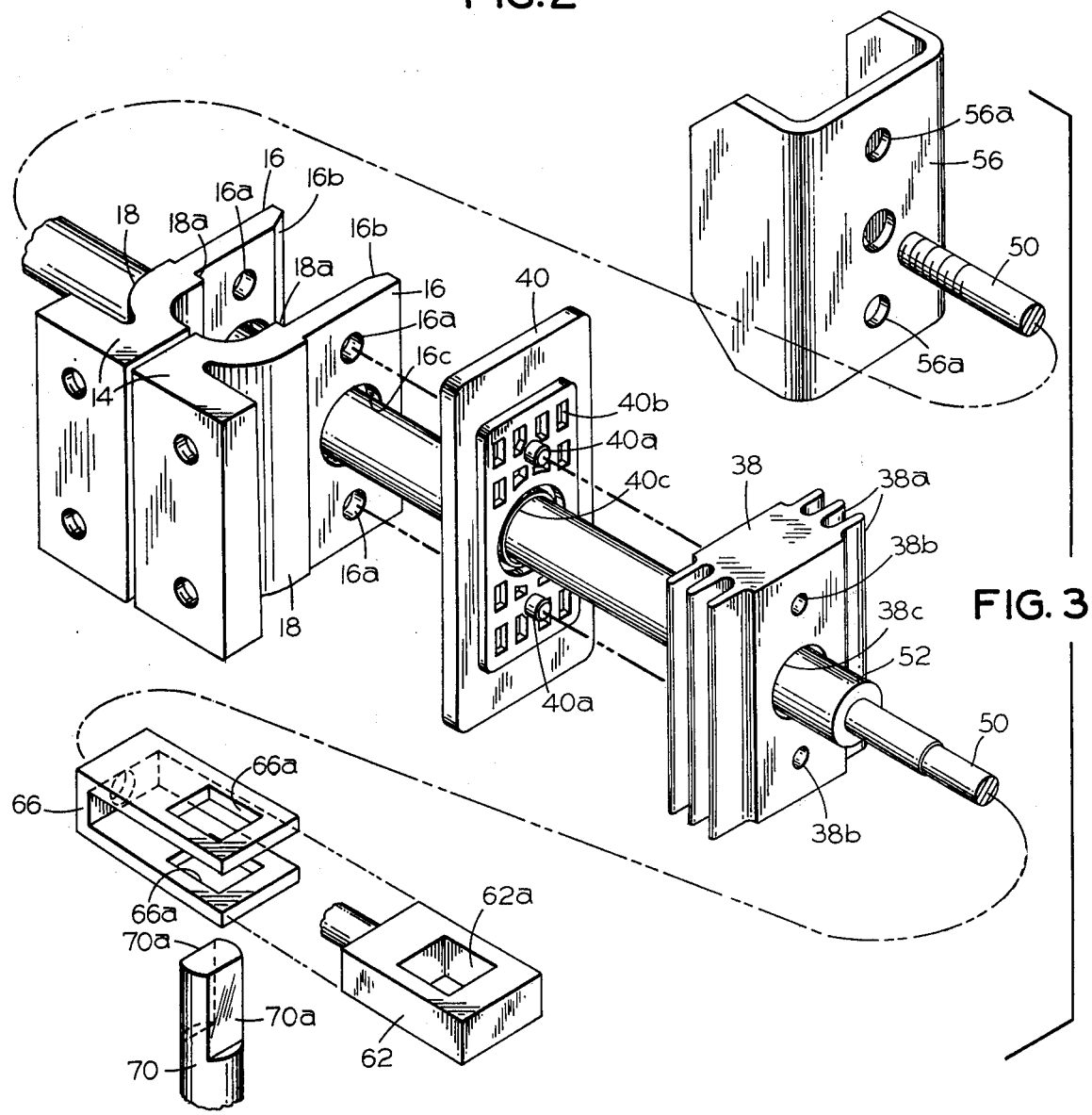
fIG. 3 is an exploded, perspective view of a portion of the stab connector stack assembly included in the joint apparatus of FIG. 1.

The electrical joint apparatus of the present invention, as seen in FIG. 1, includes an array of stab electrical connectors, each generally indicated at 10, and an array of receiver electrical connectors, each generally indicated at 12. Each stab connector, as also seen in FIG. 3, consists of two halves, 10a and 10b, with each half formed having a shoulder 14 and a contact finger 16 integrally interconnected by an arcuate, integrally formed arm 18. Each receiver connector is similarly formed in two halves, 12a and 12b, with each half comprising a shoulder 20 and a contact finger 22 integrally interconnected by an arm 24. Constructing the stab and receiver connectors in this manner affords significant manufacturing economies since the connector halves can be produced by an extrusion process. It will be noted that the two hales of the respective stab and receiver connectors are identically configured, and thus may be cut from the same extrusions.

Still referring to FIG. 1, the two halves of each stab connector 10 are arranged in mirror image relation and secured in electrical connection with respective conductive bars 26 by bolts 28 threaded into taped bores in the shoulders 14. The bars 26 may be constituted by terminal straps of a poly-phase electrical device, such as a circuit breaker 29 seen in phantom in FIG. 6. Similarly the shoulders 20 of the receiver connector halves, likewise arranged in mirror image relation, are clamped by bolts 30 in electrical connection with respective bars 32, which may be constituted by the vertical busbars of an electrical switchboard. Reference numeral 33 in FIGS. 1 and 6 designates an insulative mounting panel, such as disclosed in U.S. Pat. No. 3,858,092, serving to mount the busbars to the switchboard frame.

Figure 2:
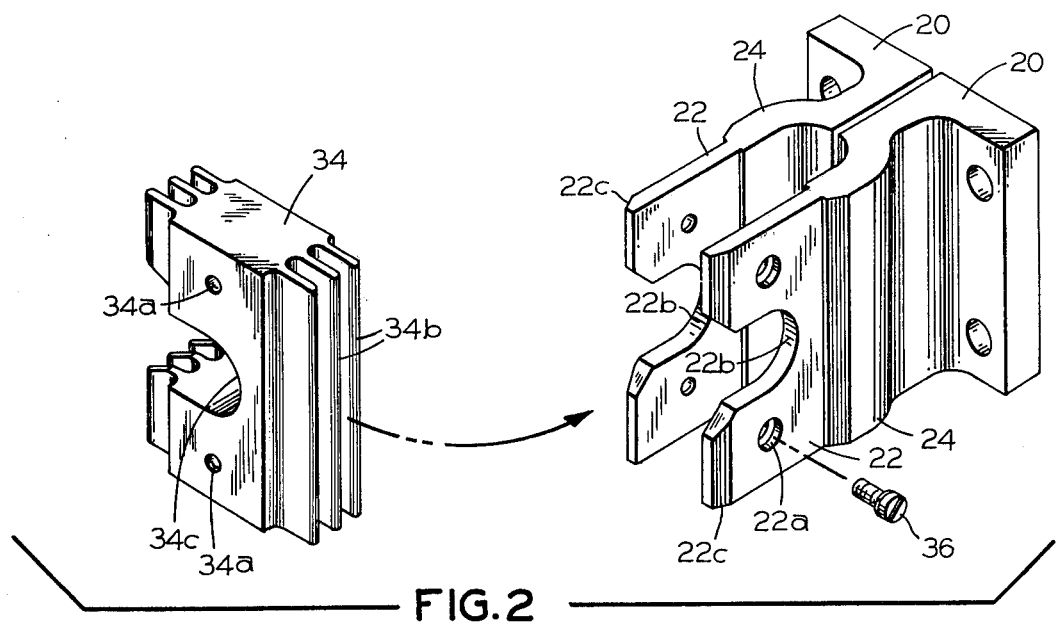
FIG. 2 is an exploded, perspective view of one of the receiver connectors included in the joint apparatus of FIG. 1.

Turning to FIG. 2, each receiver connector 12 is equipped with a heat sink 34 which is received between contact fingers 22 of the connector halves and secured in place by bolts 36 received through countersunk holes 22a in the receiver fingers and threaded into tapped bores 34a formed in the heat sink body. Countersinking the holes 22a permits the heads of bolts 36 to be recessed below the outer surfaces of the receiver fingers 22, which, as seen in FIG. 1, respectively engage the inner surfaces of stab fingers 16 when the stab-receiver joints are engaged. Heat sinks 34 are provided with a series of fins 34b to promote radiation of the heat generated in the joints to the surrounding atmosphere. For reasons to become apparent, the receiver fingers 22 and heat sinks 34 are provided with aligned, rearwardly extending notches 22b and 34c respectively.

Referring jointly to FIGS. 1 and 3, the stab connectors are ganged together as a stab connector stack assembly which includes a heat sink 38 positioned between adjacent stab connectors. Suitable insulators 40 are interposed between each end of the heat sinks and the adjacent stab fingers 16 so as to electrically isolate the stab connectors of adjacent phases. Insulators 40 are suitably configured so as to provide the requisite oversurface and through air clearances between phases. Like heat sinks 34, heat sinks 38 are provided with fins 38a to promote radiation of the heat generated in the joints to the surrounding atmosphere. Insulators 40, as best seen in FIG. 3, are molded with a pair of posts 40a extending laterally from each side of the insulator body. One pair of these posts are received in holes 16a formed in the stab fingers 16, while the other pair are received in holes 38b formed in the heat sink body (also FIG. 1). By virtue of this construction, the heat sinks 38 and insulators 40 of the stab connector stack assembly are effectively interlocked with the stab connectors 10. The rectangular indentations 40b in the bodies of insulator 40, as seen in FIG. 3, represent coring which is commonly resorted to in the molding art when forming plastic parts of varying thickness dimensions.

Figure 6:
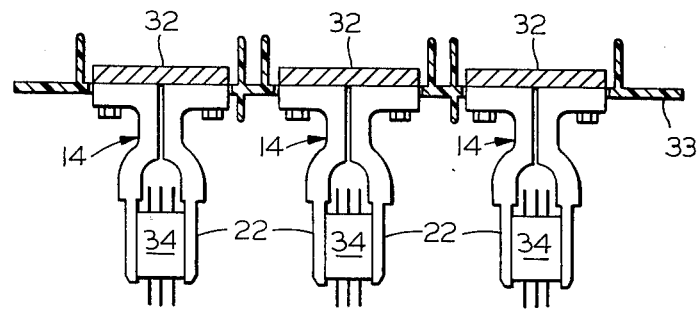
FIG. 6 is a plan view of the joint apparatus of FIG. 1 with the stab and receiver connectors in disengaged relation.
Figure 6:
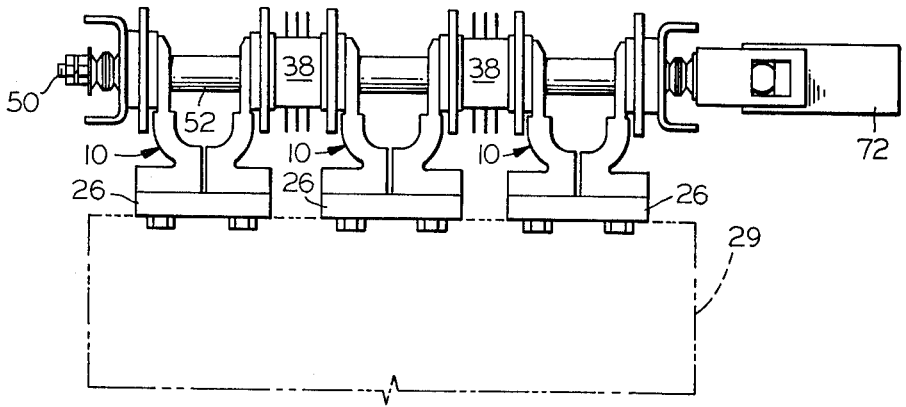

To facilitate movement of the stab connector stack assembly from a position of disengagement, seen in FIG. 6, into a position of engagement with the receiver connector array, seen in FIG. 1, the inner corners of the stab fingers are beveled, as indicated at 16b, and the outer corners of the receiver fingers are also beveled, as indicated at 22c, such that the stab fingers are led into overlapping relation with the receiver fingers. The fully engaged positions of the stab and receiver connectors are determined by the abutment of the free edges of the receiver fingers 22 against ledges 18a formed at the junctions of the stab fingers with their supporting arms 18.

Figure 4:
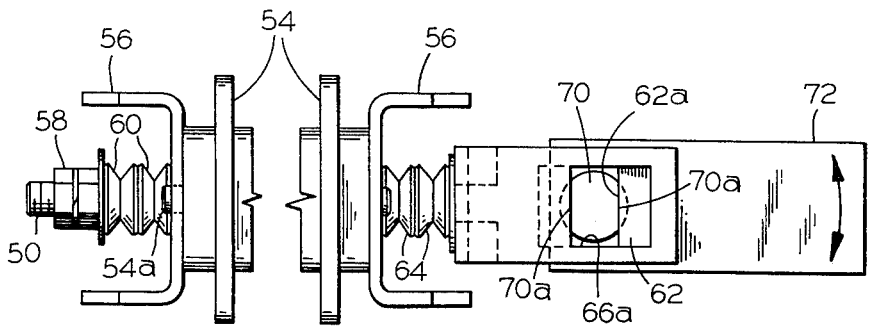
FIG. 4 is a plan view, partially broken away, of a joint clamping mechanism incorporated in the joint apparatus of FIG. 1, with the mechanism parts in their joint unclamped positions.

With the stab and receiver connectors in their fully engaged positions seen in FIG. 1, it remains to clamp the lapped contact fingers in secure electrical interconnection. To this end, a clamping mechanism, such as disclosed in the above-noted co-pending application, Ser. No. 698,280, is utilized to exert the requisite joint clamping forces. Thus, as seen in FIGS. 1 and 3, an elongated clamping rod 50 is inserted freely through aligned apertures 16c in stab fingers 16, central apertures 40c in the insulators 40, and central openings 38c in heat sinks 38. In addition, clamping rod 50 passes through the notches 22b in the receiver fingers and the notches 34c in the heat sinks 34. Clamping rod 50 is encased in an insulated sleeve 52 so as to be electrically isolated from the contact fingers and heat sinks. In addition, a centrally apertured insulator 54 is loosely received on each end portion of clamping rod 50 beyond the outboard stab connectors of the stab connector stack assembly. The left end of clamping rod 50 as seen in FIGS. 3 and 4, passes through a central opening in a U-shaped clamping plate 56 and terminates in a threaded portion accommodating nuts 58. Captured on the left end of the clamping rod intermediate the nuts and clamping plate are a series of Belleville spring washers 60. Like the intermediate insulators 40 of the stab connector array, the outer insulators 54 are provided with opposed pairs of posts 54a which are received in holes 16a in the outboard stab fingers and holes 56a formed in the clamping plate 56 to lock the angular orientation of these elements relative to the stab connectors.

The right end of clamping rod 50 passes through a central opening in the adjacent outboard insulator 54, a central opening in another U-shaped clamping plate 56, and terminates in a cam follower 62 having formed therein a rectangular opening 62a, as best seen in FIG. 3. Also accommodated on the clamping rod intermediate follower 62 and the clamping plate 56 is a second set of Belleville washers 64. As more clearly disclosed in the above-noted co-pending application, a U-shaped cam follower 66 is formed with an aperture in its bight portion through which the right end of clamping rod 50 freely passes. The legs of cam follower 66 are spaced apart sufficiently to receive therebetween cam follower 62 at the right end of the clamping rod. Rectanguler openings 66a are provided in the cam follower legs in opposed relation with rectangular opening 62a and follower 62. The Belleville spring washers are carried on the clamping rod intermediate cam follower 66 and clamping plate 56.

As disclosed in detail in the above-noted co-pending application, the joint clamping mechanism utilizes camming means conveniently in the form of a clamping shaft, seen at 70 herein. The terminal end portion of this clamping shaft extends through the rectangular openings in the cam followers of the stab connector stack assembly, and is provided with opposed flats 70a. in the quiescient condition of the joint clamping mechanism, clamping shaft 70 is angularly oriented as seen in FIG. 4, such that its flats 70a are arranged perpendicular to the axis of clamping rod 50. Thus, these flats engage the outer edge of the rectangular opening 62a in follower 62 and the inner edges of the rectangular openings 66a in follower 66. In this unclamped condition, the Belleville washers at each end of the stab connector stack assembly are essentially relaxed. Consequently, the clamping mechanism is not exerting any significant clamping forces on the stab connector fingers, and the stab connector stack assembly can readily move into and out of engaging relation with the receiver connector array (FIGS. 1 and 6).

Figure 5:
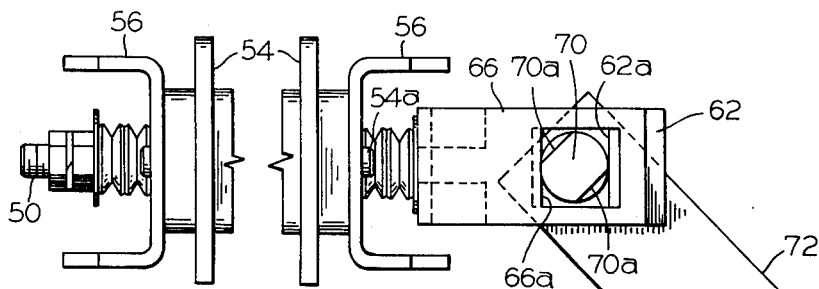
FIG. 5 is a plan view, partially broken away, of the joint clamping mechanism of FIG. 4, depicted in its joint clamped condition.

With the stab and receiver connectors fully engaged, rotation of clamping shaft 70 in either direction, such as by a crank arm 72, swings the rounded portions of its shaft termination into engagement with opposed edges of the rectangular openings in the cam followers. As a result, follower 62 is camed to the right, as seen in FIGS. 4 and 5, pulling with it clamping rod 50 and thereby loading the Belleville washers 60 at the left end of the stab connector stack assembly. At the same time, the follower 66 is cammed to the left as seen in FIGS. 4 and 5, to load the Belleville washers 64 at the right end of the stab connector stack assembly. These Belleville washers at each end of the stab connector stack assembly develop oppositely directed forces which are coupled through the insulators and heat sinks to the lapped contact fingers pursuant to clamping the stab and receiver connectors in secure electrical connection.

It will be appreciated that the disclosed electrical joint apparatus offers numerous advantages. The designed differential in the effective diameters of the clamping shaft flats versus the rounded portions of the shaft termination is operative to impart a predetermined and highly repeatable loading or compression of the sets of Belleville washers at each end of the stab connector stack assembly. Thus the clamping forces developed by these springs are equally predetermined and repeatable. Since these clamping forces are essentially equal and oppositely directed, there is no significant resulting forces acting on the plural joints. The nuts, threaded on the end of the clamping shaft are turned to readily establish the desired clamp force magnitude. While Belleville washers are illustrated, it will be appreciated that other forms of joint clamping force generating springs may be utilized.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. Electrical joint apparatus comprising, in combination:
   A. an array of spaced first electrical connectors, each having a pair of contact elements arranged in parallel spaced relation;
   B. an array of second electrical connectors, each associated with a different one of said first connectos and having a pair of contact elements arranged for juxtaposition in individual lapped relation with respective contact elements of its associated one of said first connectors,
   B. each said first and second electrical connectors formed from two connector halves mounted in side-by-side relation, each said connector half consisting of a shoulder for affixation in electrical connection with a current carrying element and an arm integrally joining said shoulder with one of said contact elements;
   C. an elongated clamping rod extending freely through apertures in the contact elements of each said first electrical connector;
   D. a first cam follower affixed to one end of said rod;

E. a second cam follower movably supported on said rod adjacent said one end thereof in juxtaposed relation with said first cam follower;

F. first compression spring means interposed between said second cam follower and the first connector at one end of said array;

G. a stop affixed to the other end of said rod;

H. second compression spring means interposed between said stop and the first connector at the other end of said array; and I. camming means movable between joint clamping and joint unclamping positions, said camming means while in said unclamping position controllably engaging said first and second cam followers to sustain said first and second compression spring means in substantially unloaded conditions to thereby permit said contact elements of said first and second connectors to move into and away from lapped relation, said camming means operable in said clamping position to cam said first and second followers in opposite directions to uniformly load said first and second spring means such as to develop substantially equal and oppositely directed forces effective to clamp said lapped contact elements in secure electrical interconnection.

2. The electrical joint apparatus defined in claim 1, wherein said connector halves forming each said connector are identically configured and are mounted in mirror image relation.

3. Electrical joint apparatus comprising, in combination:

A. an array of spaced first electrical connectors, each having a pair of contact elements arranged in parallel spaced relation;

B. an array of second electrical connectors, each associated with a different one of said first connectors and having a pair of contact elements arranged in parallel spaced relation, said contact elements of each said first connector being more widely separated than said contact elements of its associated second connector, whereby said first connector contact elements can assume lapping relationships with the outside surfaces of their associated second connector contact elements;

C. an elongated clamping rod extending freely through apertures in the contact elements of each said first electrical connector;

D. a first cam follower affixed to one end of said rod;

E. a second cam follower movably supported on said rod adjacent said one end thereof in juxtaposed relation with said first cam follower;

F. first compression spring means interposed between said second cam follower and the first connector at one end of said array;

G. a stop affixed to the other end of said rod;

H. second compression spring means interposed between said stop and the first connector at the other end of said array; and I. camming means movable between joint clamping and joint unclamping positions, said camming means while in said unclamping position controllably engaging said first and second cam followers to sustain said first and second compression spring means in substantially unloaded conditions to thereby permit said contact elements of said first and second connectors to move into and away from lapped relation, said camming means operable in said clamping position to cam first and second followers in opposite directions to uniformly load said first and second spring means such as to develop substantially equal and oppositely directed forces effective to clamp said lapped contact elements in secure electrical interconnection.

4. The electrical joint apparatus defined in claim 3, which further includes a heat sink mounted between said contact elements of each said second connector.

5. The electrical joint apparatus defined in claim 4, which further includes an additional heat sink disposed in each space between adjacent first connectors.

6. The electrical joint apparatus defined in claim 5, which further includes an insulator interposed between each end of each said additional heat sink and the first connector adjacent thereto.

7. The electrial joint apparatus defined in claim 6, wherein each said additional heat sink and each said insulator are centrally apertured to freely accommodate the extension of said clamping rod therethrough.

8. The electrical joint apparatus defined in claim 7, wherein said contact elements of said second connectors and said heat sinks mounted therebetween are notched to avoid interference with said clamping rod while said contact elements of said first and second connectors are in lapped relation.

9. Electrical joint apparatus comprising, in combination:

A. an array of first electrical connectors commonly mounted in spaced relation, each said first connector mounting a pair of contact elements in parallel spaced relation;

B. an array of second electrical connectors commonly mounted independently of said first connector array, each said second connector associated with a different one of said first connectors and mounting a pair of contact elements arranged in parallel spaced relation, the separation between the paired contact elements of each said first connector being greater than the separation between the paired contact elements of its associated second connector, whereby said contact elements of each said first connector are arranged for juxtaposition in individual lapped relation with the outer surfaces of respective contact elements of the associated second connector;

C. a heat sink mounted between said paired contact elements of each said second connector; and D. a joint clamping mechanism coupled with said first connector array and, upon movement of one of said connector array into juxtaposition with the other, operative to exert clamping forces effective to clamp each said contact element of each said first connector in secure electrical interconnection with the contact element of the associated second connector in lapped relation therewith.

10. The electrical joint apparatus defined in claim 9, wherein each said first and second electrical connectors is formed from two connector halves mounted in side-by-side relation, each said connector half consisting of a shoulder for affixation in electrical connection with a current carrying element and an arm integrally joining said shoulder with one of said contact elements.

11. The electrical joint apparatus defined in claim 10, wherein said connector halves forming each said connector are identically configured and are mounted in mirror image relation.

12. The electrical joint apparatus defined in claim 9, which further includes an additional heat sink disposed in each space between adjacent first connectors.

13. The electrical joint apparatus defined in claim 12, which further includes an insulator interposed between each end of each said additional heat sink and the first connector adjacent thereto.

14. The electrical joint apparatus defined in claim 13, wherein said clamping mechanism includes an elongated clamping rod extending freely through aligned apertures in each said first connector contact element, each said insulator, and each said additional heat sink.

15. The electrical joint apparatus defined in claim 14, wherein said contact elements of said second connectors and said heat sinks mounted therebetween are notched to avoid interference with said clamping rod while said contact elements of said first and second connectors are in laped relation.

* * * * *

UNITED STATES PATENT OFFICE
CERTIFICATE OF CORRECTION

PATENT NO. : 4,033,660
DATED : July 5, 1977
INVENTOR(S) : Eric A. Ericson and Frederick D. Kaufhold It is certified that error appears in the above-identified patent and that said Letters Patent are hereby corrected as shown below:

Col. 6, line 53, "connectos" should be changed to --connectors--.

Col. 6, line 57, the second "B" should read as --1)--.

Col. 7, line 68, after "cam" insert the word --said--.

Col. 8, line 1, "loan" should be changed to --load--.

Col. 8, line 16, "electrial" should be changed to --electrical--.

Col. 10, line 8, "laped" should be changed to --lapped--.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*